(12) United States Patent  
Jacob

(10) Patent No.: US 6,976,432 B2  
(45) Date of Patent: Dec. 20, 2005

(54) ROAD/RAIL VEHICLE WITH LOAD-SHIFTING DEVICE

(76) Inventor: Charles Jacob, P.O. Box 611, American Fork, UT (US) 84003

( * ) Notice: Subject to any disclaimer, the term of this patent is extended or adjusted under 35 U.S.C. 154(b) by 0 days.

(21) Appl. No.: 10/804,816

(22) Filed: Mar. 19, 2004

(65) Prior Publication Data

US 2005/0204949 A1 Sep. 22, 2005

(51) Int. Cl.$^7$ .............................................. B61F 13/00
(52) U.S. Cl. ........................................ 105/72.2; 105/73
(58) Field of Search ........................... 105/72.2, 75, 73; 104/2; 280/405.1, 758, 759, 407, 407.1, 187

(56) References Cited

U.S. PATENT DOCUMENTS

| | | | |
|---|---|---|---|
| 2,864,627 A | * | 12/1958 | Kleinknecht ................ 280/401 |
| 2,916,172 A | * | 12/1959 | Locke ......................... 187/222 |
| 2,986,407 A | * | 5/1961 | Krueger ................... 280/405.1 |
| 3,019,742 A | | 2/1962 | Kershaw |
| 3,198,137 A | | 8/1965 | White, Jr. |
| 3,249,067 A | | 5/1966 | Keller |
| 3,356,042 A | | 12/1967 | Herscovitch |
| 3,804,025 A | | 4/1974 | Elliott |
| 5,103,740 A | * | 4/1992 | Masse ...................... 105/72.2 |
| 5,586,507 A | | 12/1996 | Madison et al. |
| 6,021,719 A | | 2/2000 | Kershaw, Jr. |

\* cited by examiner

Primary Examiner—Mark T. Le
(74) Attorney, Agent, or Firm—Thorpe, North & Western LLP

(57) ABSTRACT

A railcar-moving vehicle comprises a modified semi-tractor, having a highway mode for operation on roadways, and a rail mode for operation on rails. The vehicle includes an elongate frame with selectively extendable high rail wheels for guiding the vehicle on rails, and rubber-tired drive wheels for operation on roadways. The rubber-tired drive wheels are configured to support the vehicle on a roadway in highway mode, and to contact the rails in rail mode. A moveable weight is disposed on a rear portion of the frame. A load-shifting mechanism moves the moveable weight between a rearward position for rail mode and a forward position for highway mode.

20 Claims, 3 Drawing Sheets

ROAD/RAIL VEHICLE WITH LOAD-SHIFTING DEVICE

BACKGROUND OF THE INVENTION

1. Field of the Invention

This invention relates to railcar-moving vehicles that are adaptable both for moving railcars along railroad track and for driving on roadways.

2. Related Art

In the railroad industry, maintenance of way is a critical activity and a major expense. Frequently, when maintenance is needed at a particular location along the right-of-way and heavy equipment or materials are required, a work train and crew are sent to that location to perform the needed repairs. For example, a work train may carry a load of railroad ties and short sections of rail for repairing track, and may include some pieces of heavy equipment for unloading and installing these items. Often, a work train consists of a locomotive pulling a single work car, and the maintenance work can be performed by one or two workers.

However, this approach can be very cost inefficient. Because maintenance of way crews and locomotive crews are differently trained and unable to perform each other's duties, the work train will frequently employ a crew much larger than actually needed at any given time. Obviously, this is costly. Furthermore, the use of a typical locomotive—which may cost in excess of a million dollars—to transport a single car and a few workers is extremely cost inefficient. For these reasons, it would be desirable to have a railcar-moving vehicle that can pull one or a few railcars along the railroad track at mainline speeds, but that is not a conventional locomotive, and thus is not as costly as a locomotive, nor requires a full locomotive crew. With such a vehicle a work crew could transport themselves to the work site with their materials and equipment, and perform the work with far less expense for labor and equipment.

Additionally, it would be desirable to have such a railcar-moving vehicle that is operable both on rails and on roadways. Such a vehicle would be valuable for maintenance of way crews by allowing a work crew to transport themselves and their equipment by highway to a rail siding, where the crew simply transfers their materials and equipment to a waiting railcar, and uses the semi tractor on the rails to pull the work railcar to the work site.

This sort of vehicle would have additional uses, as well. For example, many railroad customers have a need to move railcars and highway trailers around a rail yard or industrial site. However, except for the largest industries, the cost to purchase and maintain a conventional switching locomotive is prohibitive or economically unwarranted. Thus, lightweight multipurpose railcar-moving vehicles have been developed and used to perform many functions normally assigned to switching locomotives, but which may also be used off the track. Such modified or hybrid vehicles are more economical for many industries because of their relatively low cost and high versatility. They allow smaller industries to take advantage of the efficiency and economy of rail transport for heavy freight where otherwise they would not be able to do so.

However, conventional lightweight railcar-moving vehicles are still relatively highly specialized, limited production vehicles. The cost per horsepower of these vehicles is significantly higher than the cost of a conventional semi tractor, for example, which enjoys the cost advantages of greater mass production. Additionally, conventional railcar-moving vehicles are not designed or configured to operate on public highways as long or short haul trucks, but are confined to an industrial site or switching yard. Many of them do not have the functional and safety equipment required to be street legal, and are designed for low speed operation only, being unable to travel at speeds beyond 15 to 20 miles per hour. Moreover, they cannot operate at top speed for extended periods of time without overheating their hydraulic systems. It would thus be desirable to have a railcar-moving vehicle which is constructed from a mass produced vehicle, such as a semi tractor, so as to reduce the acquisition cost of these vehicles. It would also be desirable to have a railcar-moving vehicle which is capable of extended operation at high speeds and can be conveniently and legally used for either long or short haul transport of freight on public highways.

Because a loaded railcar may be much heavier than one of these lightweight traction vehicles, various methods have been developed to provide sufficient weight to the drive wheels of the traction vehicle. One of these methods involves adding weight to the railcar-moving vehicle over the drive wheels, so that the drive wheels have sufficient traction to move the coupled railcar. The increased weight on the drive wheels helps provide traction to the railcar-moving vehicle to allow it to move the railcar without slippage of the drive wheels on the track. However, the amount of weight needed over the drive wheels to provide sufficient traction for moving a loaded railcar results in single axle loads that exceed legal limits for highway vehicles, particularly with respect to axle load limits for highway bridges. Consequently, a railcar-moving vehicle that has sufficient weight to pull loaded railcars on rails will tend to be too heavy for highway use.

SUMMARY OF THE INVENTION

It has been recognized that it would be advantageous to have a convertible railcar-moving vehicle that can operate on highways and on rails, and that is of sufficient weight to have adequate traction for moving a loaded railcar on rails, yet has axle loads that are within legal highway load limits.

The invention advantageously provides a railcar-moving vehicle that is capable of extended operation at highway speeds both on and off rails. The vehicle comprises a modified semi-tractor, having a highway mode for operation on roadways, and a rail mode for operation on rails. The vehicle includes an elongate frame with selectively extendable high rail wheels for guiding the vehicle on rails, and rubber-tired drive wheels for operation on roadways. The rubber-tired drive wheels are configured to support the vehicle on a roadway in highway mode, and to contact the rails in rail mode. A moveable weight is disposed on a rear portion of the frame. A load-shifting mechanism moves the moveable weight between a rearward position for rail mode and a forward position for highway mode.

Other objects and features of the present invention will be apparent to those skilled in the art, based on the following description, taken in combination with the accompanying drawings.

DETAILED DESCRIPTION

Figure 1:
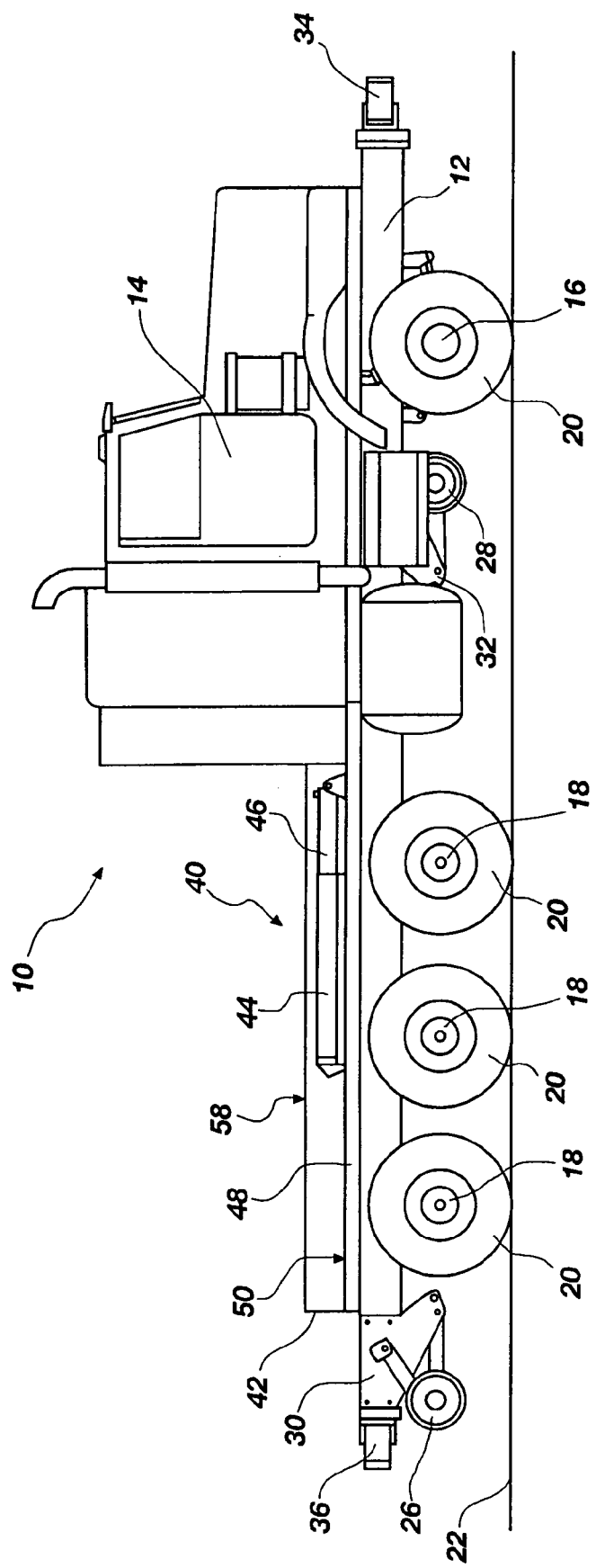
FIG. 1 is a side view of a railcar-moving vehicle in accordance with the present invention configured for highway use.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 2:
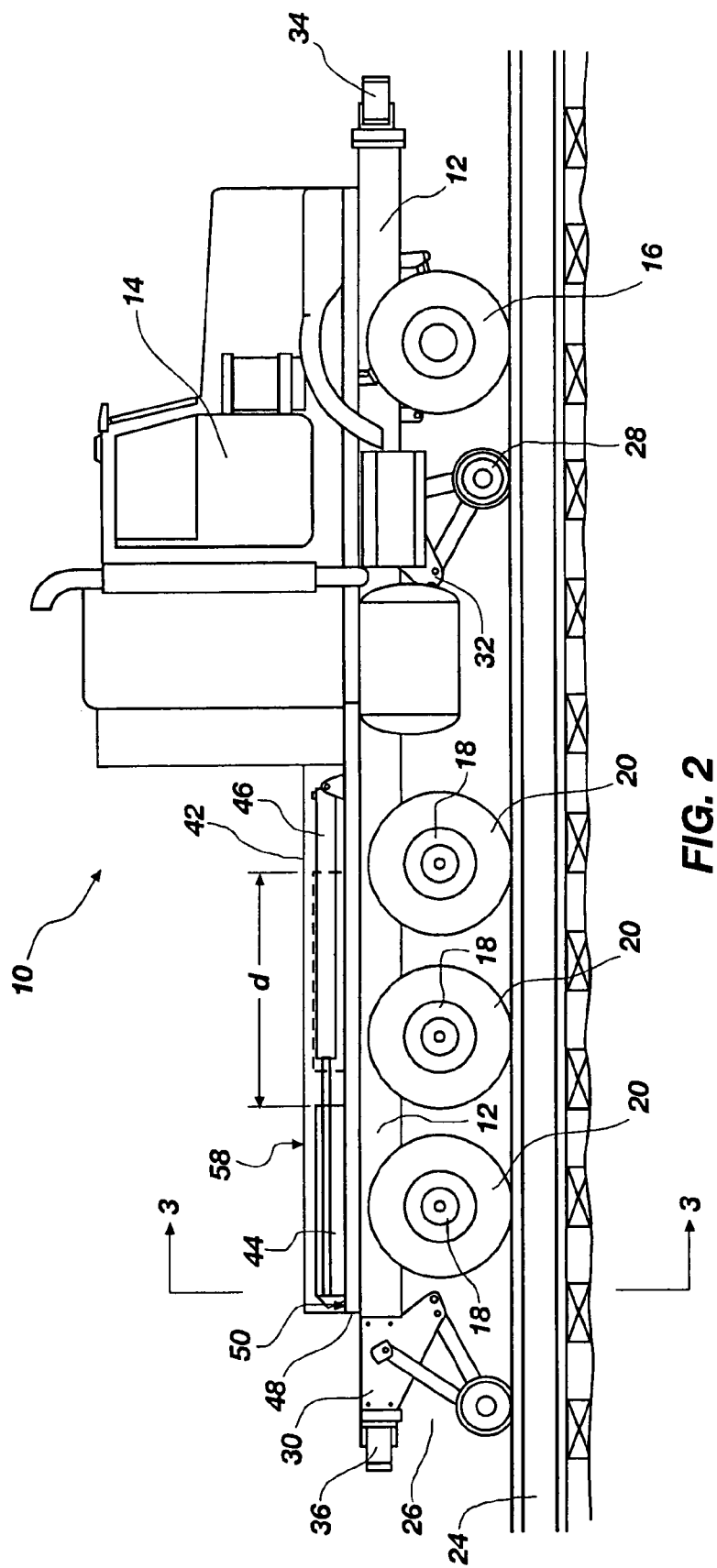
FIG. 2 is a side view of the railcar-moving vehicle of FIG. 1 configured for operation on rails.
Figure 3:
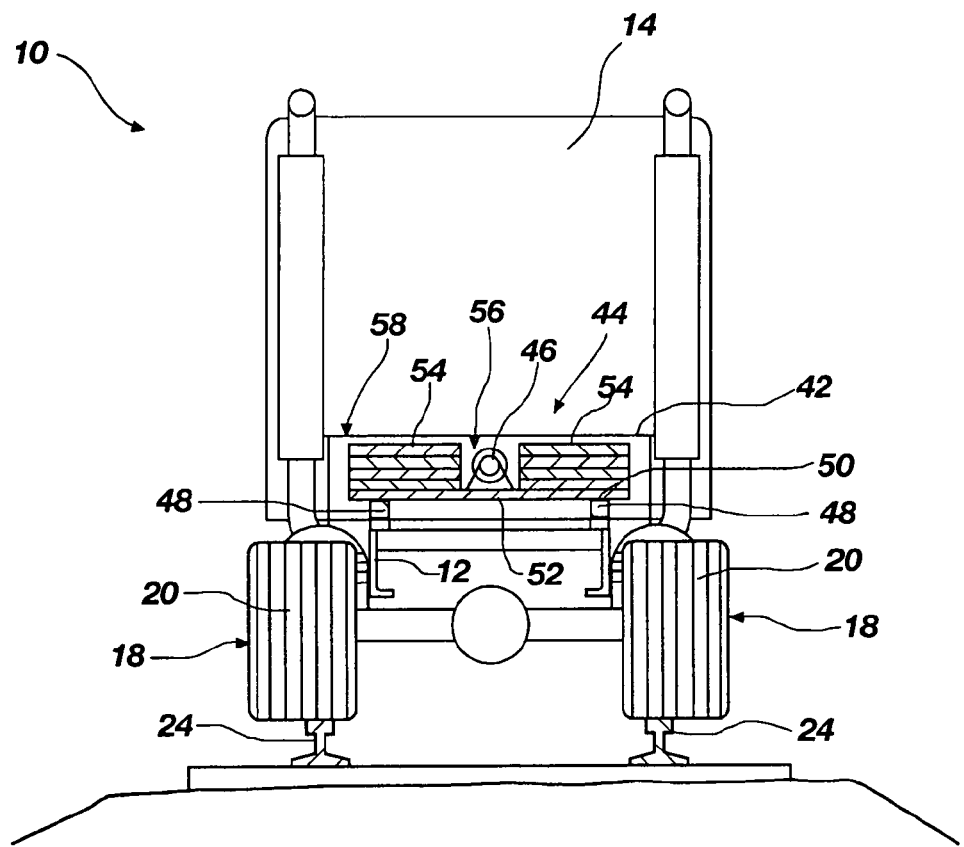
FIG. 3 is a rear end, partial sectional view of the railcar moving vehicle as configured in FIG. 2.

Shown in FIGS. 1–3 are side and rear views, respectively, of a railcar-moving vehicle 10 comprising a modified semi tractor that is convertible for use both on highways and on rails. The modified semi tractor is a conventional semi tractor in most respects, having an elongate frame 12, a cab 14 housing the engine and controls, front wheels 16 and a series of rear drive wheels 18. The front wheels and rear drive wheels include conventional inflated rubber tires 20 for use on a roadway 22, as shown in FIG. 1. These standard semi tractor features allow the vehicle to operate safely and normally on highways.

To operate on rails 24 and function as a railcar-moving vehicle, as shown in FIG. 2, the semi tractor 10 is provided with a set of "hi-rail" wheels 26 at the rear of the vehicle, and another set of hi-rail wheels 28 disposed toward the front of the vehicle. Each set of hi-rail wheels is mounted on a raising/lowering mechanism 30, 32 (e.g. a hydraulic mechanism) that allows them to be retracted/lifted to the position shown in FIG. 1 for highway use, and to be extended/lowered to the position shown in FIG. 2 for railway use. Retractable high rail wheels on convertible road/rail vehicles are well known in the railroad industry.

The front high rail wheels 28 support the front end of the modified semi tractor 10, including the cab 14, and actually lift the front wheels 16 of the modified semi tractor above the rails 24 so that these wheels will not contact the rails or rail components (e.g. switch points, frogs, guard rails, etc.). The rear high rail wheels 26 lower to contact the rails for guidance (i.e. to keep the vehicle on the track), but allow the drive wheels 18 to contact the rails with most of the load of the vehicle. In other words, the rear high rail wheels do not support a substantial share of the load of the vehicle, so that the drive wheels will have adequate load upon them for traction. The downward force of the rear high rail wheels can be adjustable so as to allow modification of the comparative portion of the vehicle load that is imposed on each rubber-tired drive wheel when on the rails.

Disposed at the front of the frame 12 of the vehicle 10 is a front coupler 34, and at the rear of the vehicle frame is a rear coupler 36. These couplers are configured for coupling the modified semi tractor to a railcar or other rail vehicle (not shown), whether for pushing or pulling such vehicles, or being pushed or pulled by them. The vehicle could also include other hitch or coupling devices, such as a pintle hitch (not shown), to allow it to tow trailers on a roadway.

Those skilled in the art will recognize that multiple drive axles and drive wheels on opposing sides of highway vehicles must be interconnected by a limited slip differential or comparable device, allowing differential rotation of driven wheels to prevent slippage of tires and binding and excessive loads on gears and other mechanical drive components when vehicles turn. These devices help compensate for the difference in distance traversed between the inside and outside wheels of a turning vehicle, and allow for differences in the position of the drive wheels relative to the center of rotation of the vehicle frame. Additionally, vehicles with multiple drive axles often only use one set of drive wheels under normal conditions, and engage additional drive axles only when on soft ground, when stuck, or when other needs arise. Such times typically involve situations where individual wheels can spin or slip, thus avoiding excessive stresses on drive mechanisms.

Advantageously, because the relatively gentle radius curves of railroad tracks result in relatively small differential distances between the various drive wheels, a plurality of drive axles can be permanently engaged with a rail vehicle. Accordingly, the drive wheels 18 of the modified semi tractor are in a tri-axle configuration, providing three sets of drive wheels for driving the vehicle on the rails 24. For rail use, all three drive axles are powered, and are directly mechanically linked. Additionally, while the vehicle is shown with three sets of fixed drive wheels (a "tri-axle" configuration), it will be apparent that a "tag axle" (not shown), that is, a retractable set of non-powered highway wheels, could also be provided. The tag axle can be lowered to contact the ground for highway use, so as to distribute the vehicle load, and be raised out of the way when on rails.

As is apparent from the rear view of FIG. 3, the drive wheels 18 of the vehicle shown are what are known as "super single" wheels, having extra wide rubber tires 20. In rail mode, these drive wheels rest atop the rails 24, the center of each drive wheel being nearly centered above the rails, each rail being approximately 1½ inches inside the center of its corresponding tire. In highway mode, each drive wheel has almost the same surface area in contact with a supporting roadway as would a pair of more common dual tires, allowing the single tires to support the large weight of the vehicle with a reasonable tire pressure.

Advantageously, a weight-shifting apparatus 40 is enclosed in an enclosure or box 42 on the rear of the frame 12 of the vehicle 10. This apparatus generally comprises a large moveable mass or weight 44 that is slidably mounted inside the box, with a hydraulic cylinder 46 attached for moving the mass. The mass is support within the box on a track or track member, such as rails 48 having low friction nylon pads 50. These pads allow the mass to slide front to rear under force from the hydraulic cylinder. It will be apparent that other mechanisms for allowing the mass to freely shift from front to back, such as roller bearings, etc., can also be used. Likewise, a variety of mechanisms, other than the hydraulic cylinder shown, can be configured for moving the moveable weight, such as an electric screw jack device, a rack an pinion device, etc.

It will be apparent that the moveable weight 44 can be configured in many different ways. In the embodiment shown, viewing the rear sectional view of FIG. 3, the mass comprises a lower steel plate 52 that extends between both support rails 48, with the distal end of the hydraulic cylinder 46 attached (e.g. bolted, welded, etc.) to the center of this lower plate. Narrower steel plates 54 are stacked atop the lower plate on either side of the hydraulic cylinder, the plates all being welded or otherwise attached together to form a substantially solid mass. The configuration shown essentially provides a large mass with a slot 56 in the center for accommodating the hydraulic cylinder.

In one embodiment, the gross weight of the modified semi tractor 10 is about 57,500 pounds, of which the moveable weight 44 comprises approximately 13,000 pounds, or about 23% of the total. Stated differently, without the moveable weight, the gross vehicle weight would be about 44,500 lb, and the moveable weight would add about 29% more weight. When the vehicle is configured for railway use, as shown in FIG. 2, the moveable weight is disposed rearwardly, with the hydraulic cylinder extended. This places the moveable weight approximately over the rearmost set of drive wheels 18, giving increased traction for pulling a railcar. However, for highway use, as shown in FIG. 1, the hydraulic cylinder is retracted, placing the moveable weight centered above a point approximately midway between the forward and middle sets of drive wheels.

Figure 4:
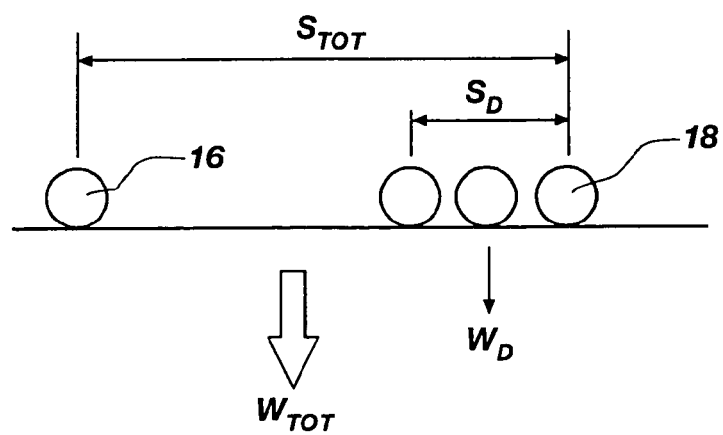
FIG. 4 is an axle load diagram for a railcar-moving vehicle like that shown in FIG. 1.

In the embodiment shown, the total distance d of travel of the moveable weight 44 is about 72 inches. It will be apparent, however, that the invention is not limited to this distance for shifting the moveable weight. When the load is located in its rearward position, as shown in FIG. 2, the total load on the drive axles 18 would exceed the axle load limit for highway use of the vehicle. This highway load limit is largely affected by highway bridge load limits for multi-axle vehicles. Provided in FIG. 4 is a diagram of axle spacing and loads that illustrates some of the principles of the present invention. Viewing FIG. 4, a set of three drive axles 18 with a total spacing $S_D$ of 9 feet can have a maximum total load $W_D$ of 42,500 pounds for highway use under U.S. highway bridge load rules. Under the same guidelines, where the total length $S_{TOT}$ of the vehicle is 23 feet, the total allowable gross vehicle weight $W_{TOT}$ cannot exceed 57,500 pounds. When the moveable weight is moved to the forward position, the present vehicle meets these highway vehicle load restrictions because a substantial portion of the load of the moveable weight is distributed to the front axle 16. However, when the load is moved to the rearward position, the center of gravity of the vehicle is moved closer to a point above the center-most drive axle, thus providing increased traction to the drive wheels.

The top surface 58 of the box 42 enclosing the weight-shifting device 40 provides a bed or cargo platform, which can be used for hauling tools, cargo, etc. While the vehicle is shown with an empty bed, it will be apparent that the rear of the vehicle can be used in many ways. For example, with adequate structural reinforcing, the bed can be used for carrying tools and supplies, railroad ties, spikes and spike drivers, rail joint supplies, welding equipment, etc. A variety of types of power equipment can also be mounted on the truck bed, such as a small crane, etc.

Advantageously, the railcar-moving vehicle described herein is very economical because it may be used both on and off of the rails. Also, because it is a modified semi tractor, rather than a limited production specialty vehicle, the economics of mass production help to keep the purchase price relatively low. Moreover, conventional small and limited use railcar-moving vehicles are typically only capable of speeds up to 15 or 20 miles per hour and are equipped with a hydraulic transmission, which overheats when operated at top speeds for any long period of time. The present invention in contrast, uses a standard, proven engine and drive train that is routinely capable of extended operation at high speeds. Because conventional semi-tractors are provided with anywhere from 8 to 18 different gears, they also have a wider range of running speeds and load-pulling capacity.

With this vehicle in any of the disclosed embodiments, a work crew can transport themselves, their materials, and equipment by highway to a rail siding close to a site of needed maintenance. The crew then simply moves the semi tractor onto the rails, and couples it to a railcar if needed to travel to the work site at track speed. Thus the same vehicle that transports them on the highway takes them to the work site with their materials and equipment. With this hybrid vehicle, maintenance of way crews can perform their work with far less labor and capital equipment expense, and less disruption of mainline rail traffic. This invention also provides railroad customers with a versatile vehicle for use on or off rails at an industrial site or rail siding.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A railcar-moving vehicle comprising:
   a modified semi-tractor, having a highway mode for operation on roadways, and a rail mode for operation on rails, and including an elongate frame;
   selectively extendable high rail wheels, configured for guiding the vehicle on rails when in rail mode; and
   rubber-tired drive wheels, disposed toward a rear portion of the frame, the drive wheels being configured to support the vehicle on a roadway in highway mode, and to contact the rails in rail mode;
   a moveable weight, slidably mounted on a track on the rear portion of the frame; and
   a load-shifting mechanism, configured to move the moveable weight along the track between a rearward position for rail mode, and a forward position for highway mode, the forward position being forward of at least some of the drive wheels.

2. The railcar-moving vehicle as described in claim 1, wherein the moveable weight weighs about 13,000 pounds.

3. The railcar-moving vehicle as described in claim 1, wherein the moveable weight weighs more than about 20% of the weight of the railcar-moving vehicle without the weight.

4. The railcar-moving vehicle as described in claim 1, wherein the total vehicle load upon all drive wheels is less than 42,500 pounds in highway mode, and more than 42,500 pounds in rail mode.

5. The railcar-moving vehicle as described in claim 1, wherein the load-shifting device comprises a hydraulic cylinder attached to the weight, configured to extend to move the moveable weight to the rearward position, and to retract to move the moveable weight to the forward position.

6. The railcar-moving vehicle as described in claim 1, wherein the forward position and rearward position require a distance of travel of the load-shifting mechanism of about six feet.

7. The railcar-moving vehicle as described in claim 1, wherein the moveable weight is disposed atop low-friction polymer pads supported by the elongate frame.

8. The railcar-moving vehicle as described in claim 1, wherein the moveable weight comprises metal plates affixed together in a single mass.

9. The railcar-moving vehicle as described in claim 1, further comprising an enclosure, surrounding the weight and the load-shifting mechanism.

10. The railcar-moving vehicle as described in claim 9, wherein the enclosure provides an upper platform for supporting cargo atop the rearward portion of the modified semi tractor.

11. The railcar-moving vehicle as described in claim 1, wherein the rubber-tired drive wheels comprise six drive wheels on three drive axles, the three drive axles being mechanically linked for providing driving power in rail mode.

12. A railcar-moving vehicle, comprising:
- a modified semi tractor, selectively reconfigurable for operation on roadways and on railroad track, said modified semi tractor having a frame, an engine, and at least one pair of drive wheels powered by said engine, said frame having a rearward portion and said drive wheels being disposed toward a rear of the rearward portion of said frame and configured to contact railroad rails when operating on railroad track;
- a coupler, configured for coupling to a railcar, disposed at a rearward extremity of the frame of the modified semi tractor;
- a moveable weight, slidably mounted on a track on the rearward portion of the frame; and
- a load-shifting device, configured to shift the moveable weight along the track between a forward position for operation on roadways, the forward position imposing a smaller portion of the load of the moveable weight upon the drive wheels, and a rearward position for operation on railroad track, the rearward position imposing a larger portion of the load of the moveable weight upon the drive wheels, so as to provide greater traction for the drive wheels when operating on railroad track.

13. The railcar-moving vehicle as described in claim 12, wherein the moveable weight weighs about 13,000 pounds.

14. The railcar-moving vehicle as described in claim 12, wherein the moveable weight weighs more than about 20% of the weight of the railcar-moving vehicle without the moveable weight.

15. The railcar-moving vehicle as described in claim 12, wherein the drive wheels comprise six drive wheels on three drive axles, the three drive axles being mechanically linked for providing driving power in rail mode, the total vehicle load upon all drive axles combined being less than 42,500 pounds when the vehicle is configured for operation on roadways, and more than 42,500 pounds when the vehicle is configured for operation on railroad track.

16. The railcar-moving vehicle as described in claim 12, wherein the load-shifting device comprises a hydraulic cylinder attached to the moveable weight, configured to extend to move the moveable weight to the rearward position, and to retract to move the moveable weight to the forward position.

17. The railcar-moving vehicle as described in claim 12, wherein the forward position and rearward position require a distance of travel of the load-shifting mechanism of about six feet.

18. The railcar-moving vehicle as described in claim 12, wherein the moveable weight is disposed atop low-friction polymer pads supported by the elongate frame.

19. The railcar-moving vehicle as described in claim 12, further comprising an enclosure, surrounding the moveable weight and the load-shifting mechanism, the enclosure providing an upper platform configured for supporting cargo atop the rearward portion of the modified semi tractor.

20. A railcar-moving vehicle comprising:
- a modified semi-tractor, having a highway mode for operation on roadways, and a rail mode for operation on rails, and including
    an elongate frame with a front portion and a rear portion;
    a coupler, configured for coupling to a railcar, disposed at a rearward extremity of the rear portion of the frame;
- front wheels disposed toward the front portion of the frame and configured to contract a roadway during operation in highway mode;
- selectively extendable high rail wheels, configured for guiding the vehicle on rails when in rail mode; and
- rubber-tired drive wheels, disposed toward the rear portion of the frame, the drive wheels being configured to support the vehicle on the roadway in highway mode, and to contact the rails in rail mode;
- a moveable weight, moveably disposed on the rear portion of the frame, the moveable weight being selectively moveable between a rearward position and a forward position;
- a load-shifting mechanism, configured to move the moveable weight between the rearward and forward positions, the forward position being such that a greater portion of the load of the moveable weight is distributed to the front wheels, and the rearward position being such that a greater portion of the load of the moveable weight is distributed to the drive wheels; and
- an enclosure, surrounding the moveable weight and the load shifting mechanism.

* * * * *